June 7, 1960 R. O. BRADLEY 2,939,694
DYNAMIC WEIGHER
Filed July 5, 1956 5 Sheets-Sheet 4
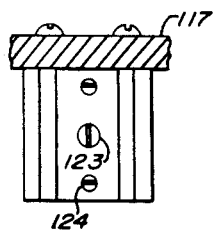
Fig. XI
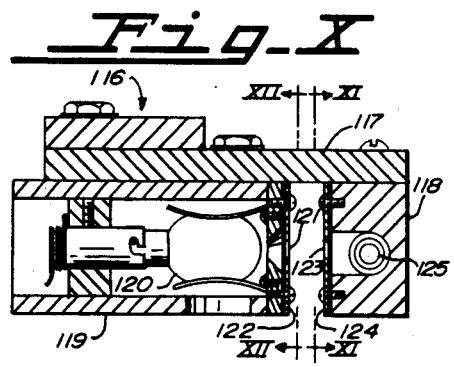
Fig. X
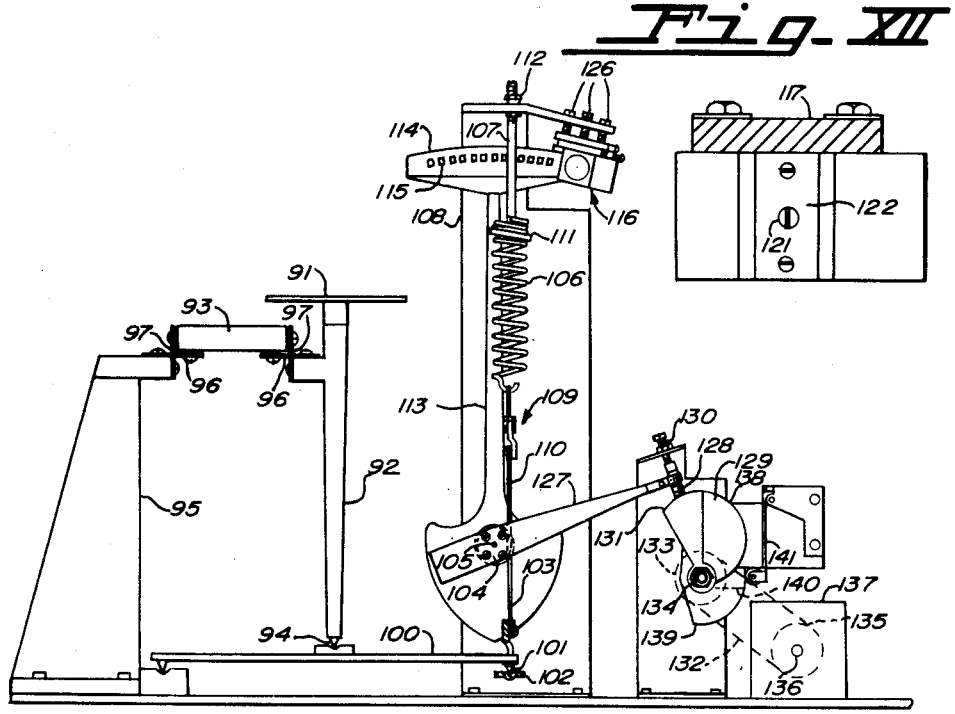
Fig. XII
Fig. IX
INVENTOR.
ROBERT O. BRADLEY
BY
Marshall, Marshall & Yeasting
ATTORNEYS

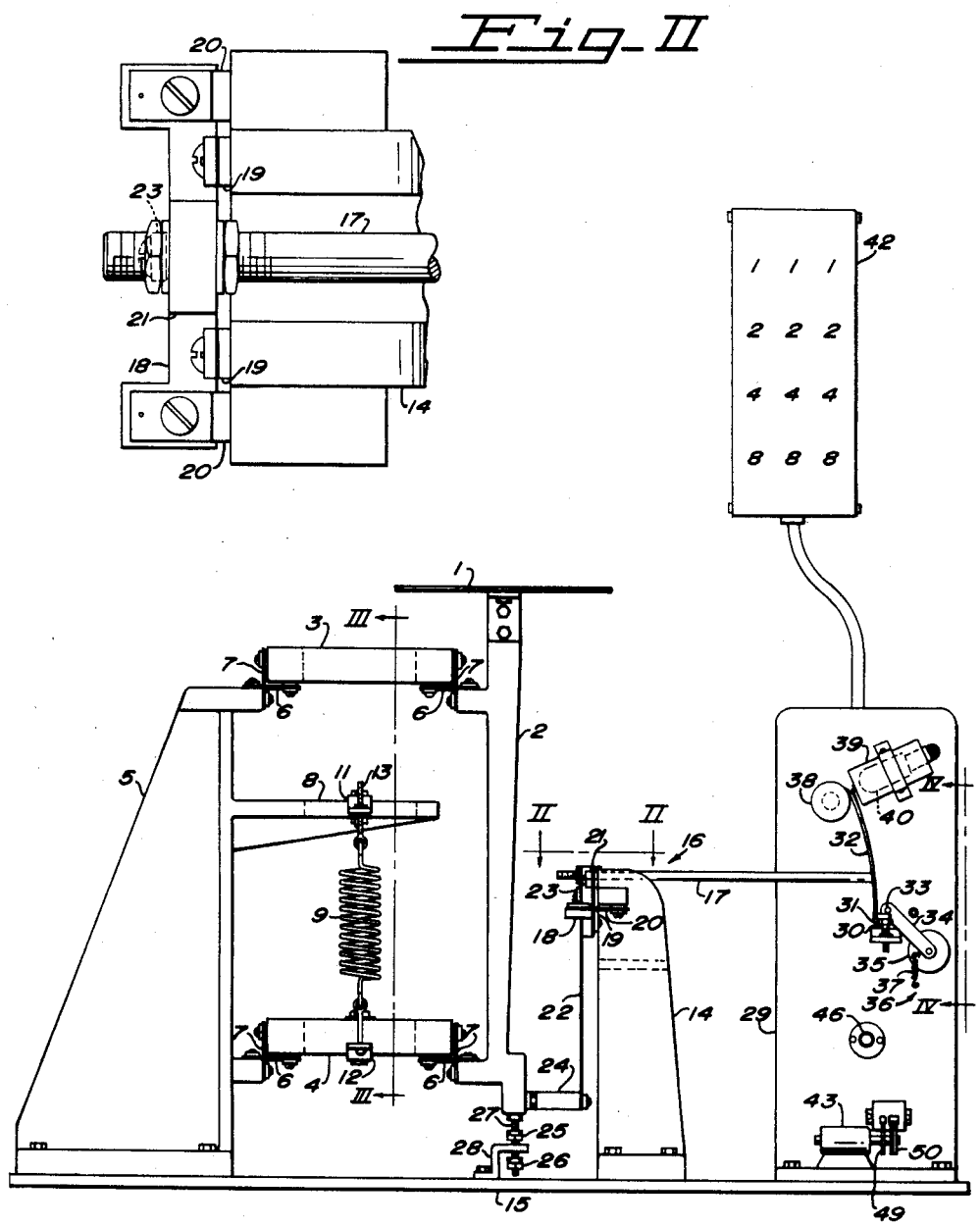
June 7, 1960 R. O. BRADLEY 2,939,694
DYNAMIC WEIGHER
Filed July 5, 1956 5 Sheets-Sheet 1
Fig. II
Fig. I
INVENTOR.
ROBERT O. BRADLEY
BY
Marshall, Marshall & Yeasting
ATTORNEYS June 7, 1960
R. O. BRADLEY
2,939,694
DYNAMIC WEIGHER
Filed July 5, 1956
5 Sheets-Sheet 2
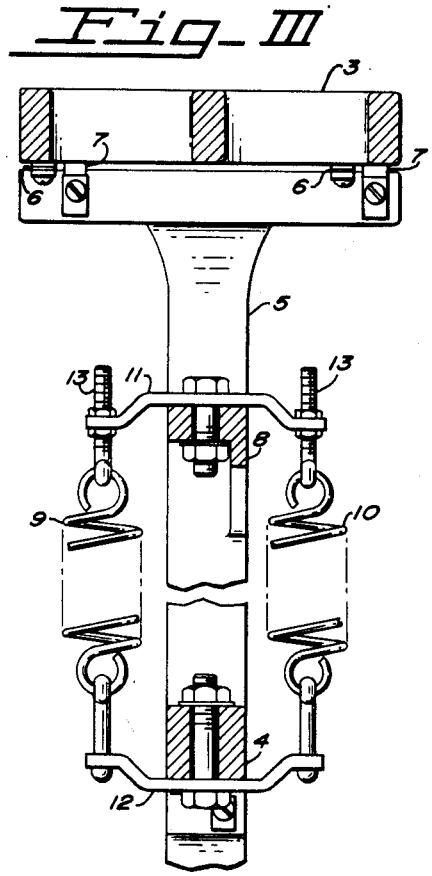
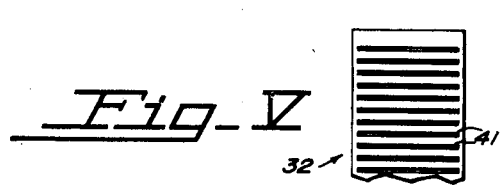
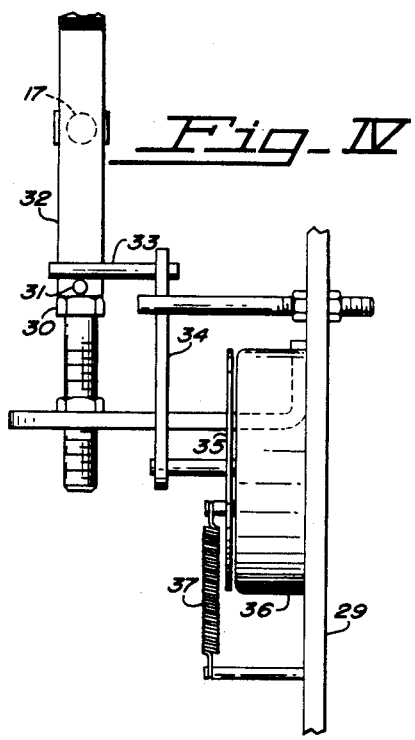
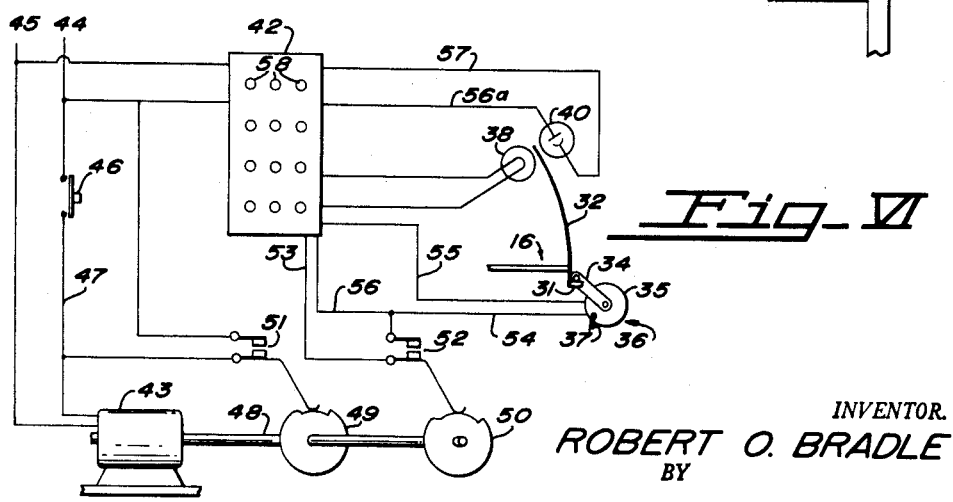
INVENTOR.
ROBERT O. BRADLEY
BY
Marshall, Marshall & Hastings
ATTORNEYS

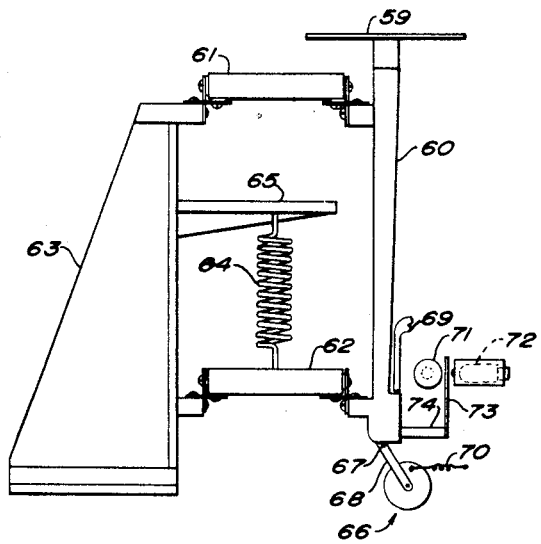
Fig. VII
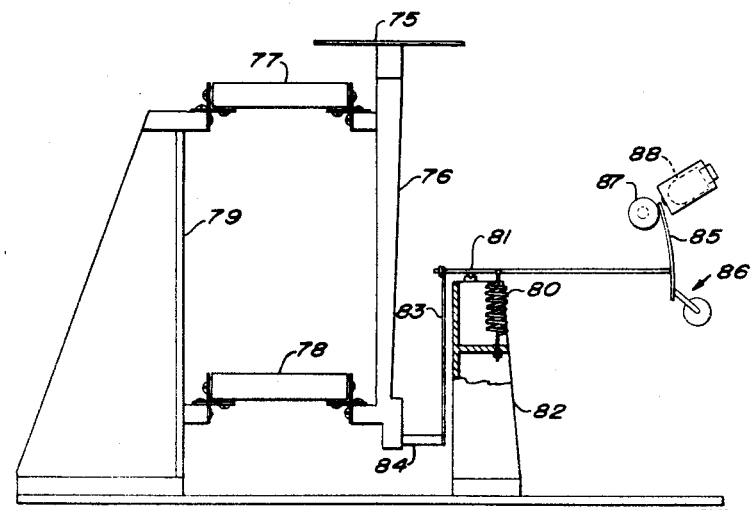
Fig. VIII
INVENTOR.
ROBERT O. BRADLEY

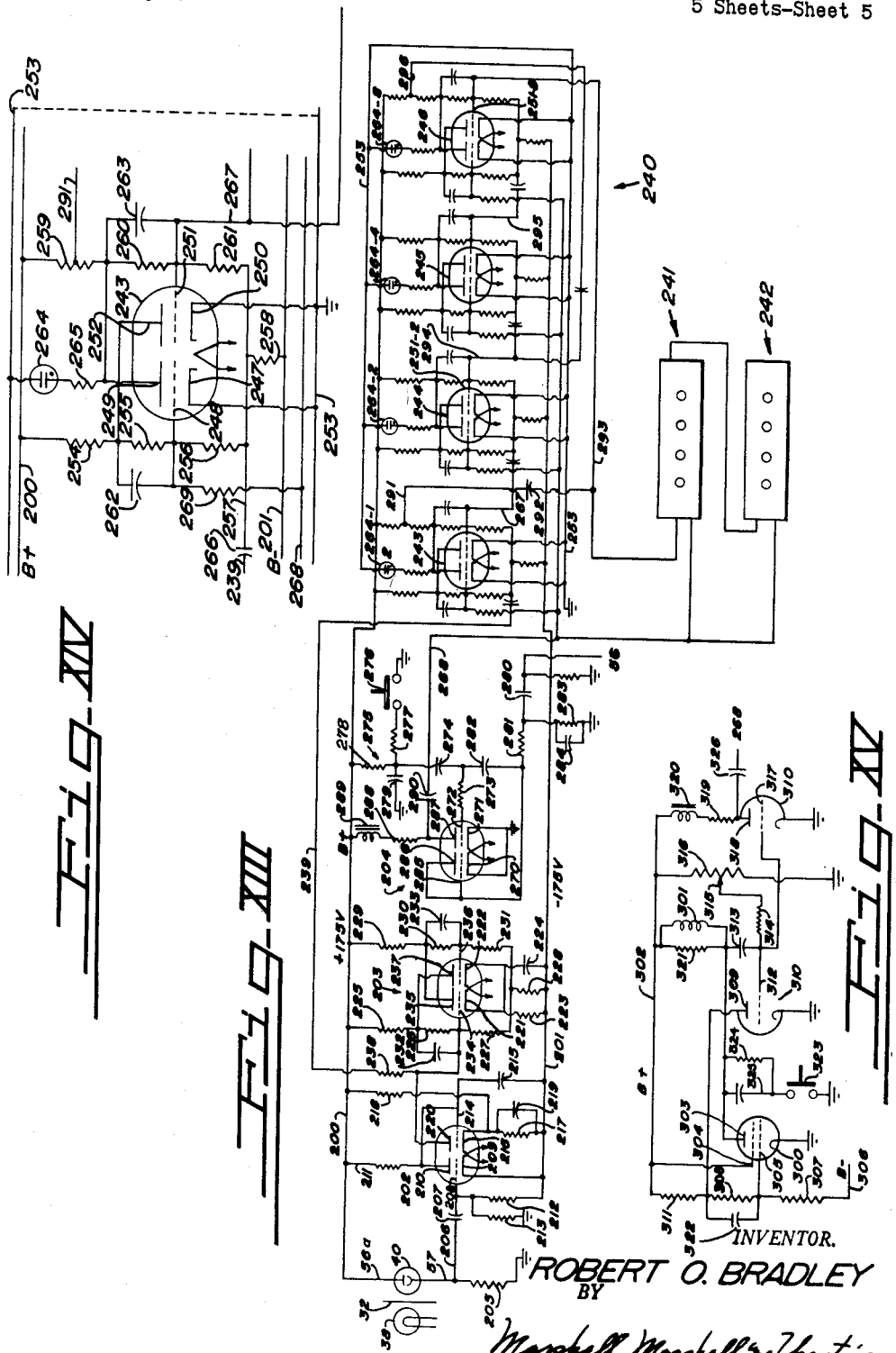

United States Patent Office 2,939,694
Patented June 7, 1960

2,939,694

DYNAMIC WEIGHER

Robert O. Bradley, Toledo, Ohio, assignor, by mesne assignments, to Toledo Scale Corporation, Toledo, Ohio, a corporation of Ohio Filed July 5, 1956, Ser. No. 596,082

5 Claims. (Cl. 265—68)

This is a continuation-in-part of Robert O. Bradley application Serial No. 331,538, filed January 16, 1953, for "Dynamic Weigher With Electronic Counter," now abandoned, and relates to weighing scales and in particular to weighing scales having very quick response to loads applied to the scale.

In the past development and improvement of weighing scales was directed toward securing more accurate indications of weight while speed of response was not considered to be of great importance. Thus, a precision balance having very high accuracy may respond so slowly that a half minute or more is required to make a weighing. Likewise beam scales, although they usually respond faster than a precision balance, are nevertheless slow in operation. The development of automatic scales employing bent lever pendulums or springs quickened the response so that, in general, a reading of weight could be made within two or three seconds from the time that the load was applied to the load receiver of the scale. Attempts to materially increase the speed of response have in general either resulted in very small gains in speed or in great loss of accuracy.

The principal object of this invention is to provide a weighing scale of high accuracy and greatly enhanced speed of response.

Another object of the invention is to provide a weighing scale in which the weight indications are presented in digits rather than by the cooperation of a chart and indicating line or pointer.

A still further object of the invention is to provide a weighing scale with a minimum of movable parts.

A still further object of the invention is to provide a weighing scale in which electronic means are employed to indicate the magnitude of the load.

A still further object of the invention is to provide a weighing scale in which the maximum deflection of a load counterbalancing spring or member attached thereto, as a load is suddenly applied to the spring, is used as a measure of the load without waiting for the load counterbalancing spring or the load to come to rest.

Another object is to insure the resetting of a dynamic weigher for subsequent weighing operations and in particular positively to urge the moving system of a dynamic weigher to the position from which it was released after that system has passed through its maximum displacement.

An additional object is to engage the moving system of a dynamic weigher with a latch which is controlled by a timing means arranged to define an interval between release and reengagement of the latch with the system which is generally equal to a period of the moving system.

A further object is to avoid mechanical wear and shock on the moving system of a dynamic weigher due to the arresting of that system by following the movement of the system as it approaches the position from which it was released with an arresting means which gradually approaches and engages the system and locks it in that position.

More specific objects and advantages are apparent from the following description of a preferred form and several modifications of the invention.

According to the invention the improved weighing scale comprises a load receiver arranged in cooperation with a load counterbalancing spring and a withdrawable catch that holds the load receiver at one point, preferably at the no load end, of its range of travel. The load counterbalancing spring is made of such stiffness that it counterbalances a full capacity load when the load receiver is at or near the middle of its allowable range of travel. Electrical signal generating means that are operatively connected either to the load receiver or to a member connected thereto and moved according to the movement of the load are adapted to generate a series of impulses as the load receiver moves, there being one impulse for each increment of movement of the load receiver. Electronic means responsive to the electrical signal means count and indicate the number of such impulses each time the load receiver is released and allowed to complete one oscillation or swing in response to a load on the load receiver. The number of impulses so counted and indicated is used as a measure of the magnitude of the load on the scale.

The moving system is positively and rapidly returned to the position from which it was released by reengaging the catch at the end of an interval generally equal to an oscillation of the moving system operatively connected to the load received. Advantageously, this catch is a rotating cam engaging a portion of the moving system and offering a sharp release of the system. A section of the cam is cut and the timed drive for the cam is arranged to free the moving system over an interval sufficient to enable the system to reach its maximum displacement. Further rotation of the cam by the timed driving means causes a face of the cam to follow the moving system on its return swing toward its release position and to gradually engage the system. In the event the system has not reached the release position, the cam gently urges it to that position and locks it there until another weighing cycle is initiated.

A preferred embodiment of the invention and several modifications are illustrated in the accompanying drawings.

Figure I is a generally schematic side elevation of a weighing scale constructed according to the invention.

Figure II is a fragmentary plan view, at greatly enlarged scale, as seen from the line II—II of Figure I.

Figure III is a vertical section, at enlarged scale, taken along the line III—III of Figure I.

Figure IV is a fragmentary end elevation, at enlarged scale, as seen from the line IV—IV of Figure I.

Figure V is a fragmentary detail of a shutter mounted on a portion of the weighing mechanism.

Figure VI is a schematic wiring diagram showing one method of control for the improved scale.

Figure VII shows a modified form of the mechanical portions of the scale.

Figure VIII shows still another modification of the mechanical structure of the scale.

Figure IX is a simplified front elevation partly in section of another form of weighing mechanism embodying the invention.

Figure X is a vertical section of the light source and photocell assembly used in Figure IX.

Figure XI is a vertical section taken along the line XI—XI of Figure X.

Figure XII is a similar vertical section taken along the line XII—XII of Figure X.

Figure XIII is a schematic wiring diagram of an electronic counter and controls suitable for use with the scale.

Figure XIV is an enlarged diagram of one stage of the electronic counter shown in Figure IX.

Figure XV is a schematic diagram of an electronic timer that may be substituted for the timing mechanism shown in Figure VI.

These specific figures and the accompanying description are intended merely to illustrate the invention but not to impose limitations on its scope.

One of the previous attempts to increase the speed of response of a weighing scale without adversely affecting its accuracy is illustrated in Williams Patent No. 2,013,937. In this structure a catch or latch is added to a simple pendulous lever scale to hold the lever at one end of its allowable range of travel and control means are provided for releasing the lever when loaded and for relatching it after a load has been removed from the load receiver. The operator of this scale watches an indicator as the lever swings and carries the indicator along a graduated chart and determines the magnitude of the load by noting the graduation opposite which the indicator reverses its direction of movement, i.e. the operator reads the maximum swing of the indicator. This scale, while accurate, is very slow in operation not only to allow the operator time to observe the maximum swing but also because of the impossibility of increasing the ratio of the restoring force to the mass of the lever without reducing its sensitivity. In the Williams device the sensitivity of the lever to small changes in load is obtained by locating the center of gravity of the lever closely adjacent to and below the fulcrum pivot of the lever. The allowable restoring effort, the force of gravity times the horizontal displacement of the center of gravity cannot be increased to get higher speed of response without reducing the sensitivity of the scale. Therefore, the only remaining possibility is to decrease the mass of the lever in an effort to reduce its moment of inertia. Efforts in this direction have been unsuccessful because it is impossible to reduce the mass and still keep a structure strong enough to carry the load and load receiver.

Patent No. 2,417,642 shows an automatic classifying device in which a lever operated on the principle shown in the Williams patent is employed as a weighing lever and wherein the lever is made with as small a moment of inertia as is possible. However, even this scale is much too slow for many weighing operations. The limitations of available materials makes it impossible to reduce the moment of inertia of the lever enough to get the desired speed of response.

According to the invention the speed of response may be vastly increased by substituting a load counterbalancing spring for the pendulous effect of a lever to counterbalance a load. This increase in speed is obtained by decreasing the distance through which the load and mechanical parts of the scale are required to move and by eliminating to a large extent rotary movements of parts which tend to greatly increase the moment of inertia of the weighing system.

With the increased speed of response obtainable from a spring it is necessary to provide improved means for measuring the extent of movement of the weighing system. It is found that electronic counters of various types are able to satisfactorily count and indicate a series of electrical impulses generated by a device responsive to movement of the load receiver or associated part at any speed at which it is possible to move the load receiver.

One embodiment of the invention is illustrated in Figures I to VI inclusive. In this embodiment a load receiver 1 is supported on a spider 2 which, by means of an upper check bar 3 and lower check bar 4 extending from a standard 5, is held in a vertical position and guided along a generally vertical path. The check bars 3 and 4 are pivotally connected to the spider 2 and standard 5 by crossed flexure plates 6 and 7, made of thin elastic metal, which are arranged with the several flexure plates 6 extending horizontally between the check bars and the spider or standard and with the flexure plates 7 extending vertically. For best results the planes of the resilient flexure plates at each pivotal connection should intersect near but not at the ends of the unsupported portions of the flexure plates.

The standard 5 includes an arm or bracket 8 located above and extending parallel to the lower check bar 4. As also shown in Figure III, a pair of helical load counterbalancing springs 9 and 10 are connected between a first yoke 11 supported on the arm 8 and a lower or second yoke 12 fastened to the lower check bar 4. While not shown, the spring connections may include pivots, particularly between the springs and the lower yoke 12. The latter connection is preferably located in the plane of the flexure plates to provide proper range in the check bar 4 serving as a lever. The connection of the upper springs 9 and 10 to the upper yoke 11 includes threaded eye bolts 13 by means of which the extension of the springs may be adjusted to vary the no-load position of the spider 2.

The laterally extending arm 8 and the lower check bar 4, the latter acting as a lever, are slotted so that the yokes 11 and 12 may be moved therealong to adjust the sensitivity of the scale, i.e. the movement of the load receiver and spider 2 for each increment of load.

The standard 5 and a second standard 14 are erected from a base plate 15 that is made sufficiently rigid to maintain the standards 5 and 14 in exact positional relation with respect to each other. The standard 14 pivotally supports an indicator lever 16 comprising a thin walled tube 17 mounted in a lever block 18 (see also Figure II) pivotally supported from the standard 14 by a pair of vertical flexure plates 19 and a pair of horizontal flexure plates 20. The lever block 18 also includes an upstanding portion 21 in which the lever tube 17 is firmly fixed.

The lever 16 is operatively connected to the spider 2 by a flexible metallic ribbon 22 the upper end of which is held under a clamp 23 on the lever block 18 while the lower end is attached to an arm 24 extending laterally from the lower end of the spider 2. The vertical flexure plates 19 and the metallic ribbon 22 are spaced apart horizontally by the thickness of the block 18 to, in effect, provide a lever arm such that the lever 16 rotates through angles that are proportional to the movement of the spider 2.

The limits of travel of the load receiver 1 and spider 2 are set by lock nuts 25 and 26 threaded on a stud 27 depending from the lower end of the spider 2 and passing through a hole in an upper horizontal arm of a Z-shaped bracket 28 attached to the base 15.

A control panel 29 is mounted from the base 15 adjacent the free end of the lever 16. To control the movement of the lever this control panel includes an adjustable stop 30 arranged in the path of a pin 31 (see also Figure IV) projecting from the lower end of a shutter 32 mounted on the free end of the lever 16. The cooperation of the stop 30 and pin 31 serve to definitely limit the downward movement of the end of the lever 16 and at the same time, through the connection of the lever to the spider, limit the upward movement of the spider 2. A catch in the form of a pin 33 extending laterally from an arm 34 attached to an armature 35 of a rotary solenoid 36 engages the upper surface of the shutter pin 31 to hold the lever 16 fixed in position as long as the rotary solenoid 36 is de-energized and a spring 37 attached to the armature 35 urges the armature in a counterclockwise direction as seen in Figure I. When the solenoid 36 is energized it rotates its armature 35 clockwise thus freeing the shutter pin 31 and allowing the lever 16 to swing. Since there is no damping in the system the inertia of the spider, load receiver, and lever carries the system past the point at which the system would eventually come to rest until the unbalance in the opposite direction is sufficient to bring the system to a stop. Since the system is now unbalanced in the opposite direction it swings back to the position shown in the figure. At this time the solenoid 36 is de-energized to allow the arm 34 and pin 33 to engage the shutter pin 31 to clamp it against the stop 30.

A light source 38 and photoelectric cell assembly 39 including a photoelectric cell 40 are mounted on the panel 29 on opposite sides of the path of the shutter 32 so that the shutter 32 controls the passage of light from the light source 38 to the photoelectric cell 40. As shown in Figure V, the shutter 32 having uniformly spaced bars 41 separated by transparent areas is adapted to allow a series of light flashes to reach the photoelectric cell as the lever 16 swings through its travel and back again. The number of such light flashes in each series corresponds to the distance through which the lever swings and is thus a measure of the load on the scale.

The operation of the improved scale in making a single weighing may be followed with reference to Figure VI. As shown in this figure an electronic counter 42 and a timing motor 43 are energized through power leads 44 and 45. When it is desired to make a weighing a start button 46 is pressed to close its contacts so that current may flow from the lead 44 through the start button 46 and lead 47 to the motor 43 and from the motor back to the return lead 45. The motor immediately starts to run and turns an output shaft 48 carrying cams 49 and 50 so that the cam 49 immediately closes a set of contacts 51 that are wired in parallel with the start button 46. As soon as the contacts 51 are closed the start button 46 may be released. As the shaft 48 continues to turn the second cam 50 closes a second set of contacts 52 so that current may flow from the electronic counter 42 through a lead 53, the contacts 52, a lead 54, the rotary solenoid 36, and a lead 55 back to the counter 42. This energizes the solenoid 36 so that it releases the lever 16 to allow it to swing. Simultaneously the closure of the contacts 52, by suddenly changing the voltage on the lead 54, transmits a signal through a lead 56 back into the counter 42 which signal serves to reset the counter to zero in preparation for the weighing that is now starting. As the lever swings upwardly in response to a load on the load receiver 1 the shutter 32, passing between the light source 38 and photocell 40, produces a series of light flashes that are converted to electrical impulses and transmitted through leads 56a and 57 to the electronic counter 42. The number of such impulses is counted by the counter and the result displayed by lights 58 on the front of the counter.

The speed of the shaft 48 is selected in accordance with the response of the lever 16 so that the contacts 52 open to deenergize the solenoid 36 in time for the arm 34 to swing in behind the shutter pin 31 and catch the lever at or near the end of its return stroke. Simultaneously with the opening of the contacts 52 or slightly thereafter the cam 49 opens the contacts 51 to stop the timing motor 43 thus completing one weighing.

In this arrangement the photoelectric cell 40 receives light impulses during both the upward and downward swing of the lever 16 and thus gives one impulse for each edge of each of the slots (or bars) in the shutter. The photoelectric circuit and counter may be arranged to respond to the start of either the light part of a flash or the start of a dark part. The first corresponds to the leading edge of slot while the second corresponds to the trailing edge. During upward movement the upper edge of a slot is the leading edge while the lower edge leads during downward movement. Therefore, the actual resolution of the weighing is to the width of one slot or one bar of the shutter, i.e. one impulse and an even number of impulses is produced if the shutter reverses with light on the photocell (assuming that the photocell was light when the lever is released) and an odd number of impulses is produced if the shutter reverses when the photocell is dark.

While the period of time for one swing of the lever 16 varies somewhat between no-load and full-load, this change in timing is not important because the lever is moving slowly when it approaches the stop 30 and the solenoid arm 34 can catch the shutter pin 31 at a considerable distance from the stop 30. Thus considerable freedom is allowed in the variation in timing without adversely affecting the operation.

A typical weighing scale constructed according to this example is able to check weigh articles of two or three pounds weight and sort into classes differing in weight by one part in a thousand while taking less than ½ second for each weighing. By using automatic means to place objects on the load receiver 1 and remove them therefrom after weighing it has been found possible to operate this type of scale at speeds in excess of one hundred weighings per minute. Thus each complete cycle of placing an object on the scale, weighing it, and removing the weighed object occupies about 6/10 of a second. Heavier articles may be weighed more quickly since a scale designed for heavier articles may employ the same size of lever 16 with a spring much stronger than the counterbalancing springs 9 and 10 thus giving a much higher restoring force per unit of total mass.

In this first example the load counterbalancing spring is connected between the lower check bar 4 and the laterally extending arm 8 of the standard 5 while the indication of load is taken from the travel of the lever 16 which is pivotally supported on the second standard 14. While this arrangement is advantageous for certain applications it may preferably be modified in adapting the equipment for certain other weighing applications. Figure VII shows a modification in which the lever 16 and the standard 14 are completely eliminated. In this example a load receiver 59 is carried on a spider 60 that is maintained upright and guided by an upper check bar 61 and lower check bar 62 attached to a standard 63. Loads applied to the load receiver 59 are counterbalanced by a weighing spring 64 connected between a laterally directed arm 65 of the standard 63 and the lower check bar 62. A rotary solenoid 66 is located generally beneath the spider 60 and arranged so that a pin 67 projecting from an armature arm 68 engages the lower end of the spider 60 and drives the spider upwardly against a stop 69 when the solenoid is de-energized and a spring 70 connected to the armature urges the armature clockwise. The movement of the load receiver 59 and spider 60 in response to a load as the pin 67, serving as a catch, is withdrawn is measured by the number of light impulses from a light source 71 that are received by a photocell 72. The light impulses are produced by a shutter 73 mounted on an arm 74 of the spider 60, the shutter 73 being perforated, slotted, or notched so as to intermittently interrupt the light beam from the light source 71 as the shutter 73 moves. This arrangement, by eliminating the inertia of the lever 16 of the first example, is somewhat faster in operation than a scale constructed according to the first example. A weighing scale constructed according to this embodiment and having a total range of travel of the load receiver of two inches has a response speed of approximately ⅓ of a second for a weighing. This scale thus could be used with automatic equipment, even with the two inch stroke for high accuracy, at speeds of 150 weighings per minute provided the loading equipment takes less than 1/15 of a second per weighing. This speed could be further increased by shortening the range of travel and strengthening the spring 64. Thus if the stroke is reduced to a total movement of ½ inch for full load, a weighing would take approximately ⅙ of a second. At these speeds of operation it is essential that electronic means be employed to measure the movement of the load receiver since no mechanical indicating equipment is capable of accurately following the movement and indicating precisely the magnitude of the movement.

Figure VIII illustrates a modified arrangement of the structure shown in Figure I. While this arrangement is quite similar to that shown in Figure I in that it comprises a load receiver 75 carried on a spider 76 guided by an upper check bar 77 and a lower check bar 78 attached to a standard 79 it differs in that a load counterbalancing spring 80 for counterbalancing load on the load receiver 75 is not connected to the spider or check bar. Instead it is pivotally connected to a lever 81 fulcrumed on a second standard 82. The lever 81 is operatively connected to the spider 76 by a thin metallic ribbon 83 connected at its upper end to an end of the lever 81 and at its lower end to an arm 84 projecting laterally from the spider 76. The lever 81 carries a shutter 85 similar to the shutter 32 the lower end of which cooperates with a catch 86 in a form of rotary solenoid and the upper portion cooperates with a light source 87 and photocell 88 to generate a series of electrical impulses as the lever swings when released from the catch 86.

The only difference between this construction and that shown in Figure I is the location of the load counterbalancing spring 80 in relation to the spider 76 and lever 81. In this second arrangement any yielding of the standard 79 or 82 that changes the relative positions of the standards does not affect the accuracy of indication nearly as much. In the structure shown in Figure I the movement of the spider 2 is a measure of the load and the only force transmitted through the connecting ribbon 22 to the lever 16 is the force required to move the indicating lever 16. Changes in relative positions of the standard 5 and 14 change the relative position of the lever 16 and the spider 2 without moving the spider 2 since its position is controlled by the load and the springs 9 and 10. In the structure shown in Figure VIII any movement of the standards 79 or 82 does not seriously affect the indication of load because the position of the spider 76 is controlled by the lever 81 and its connection to the spider. Therefore as long as the loads to be applied to the load receiver 75 are within the load carrying capacity of the steelyard tape 83 the arrangement shown in Figure VIII is to be preferred over that shown in Figure I.

Referring now to Figure IX still another arrangement of load counterbalancing mechanism may be employed according to the invention. The load receiver 91 is supported by spider 92 pivotally mounted by knife edges 94 on lever 100. Stabilization of spider 92 is maintained by check bars 93 secured thereto and to standard 95 by horizontal flexure plates 96 and vertical flexure plates 97. In this particular arrangement load forces from load receiver 91 transmitted through a lever 100 are applied through a cone pivot 101 and stirrup bearing 102 to a flexible metallic tape 103 that is wrapped part way around and secured to a drum 104 mounted on an indicator shaft 105. The indicator shaft 105 is supported or journaled in suitable bearings so that it may turn freely without friction. Counterbalancing force to offset the load forces applied through the tape 103 is provided by a load counterbalancing spring 106 suspended by a threaded rod 107 from the upper end of a support bracket 108. The lower end of the spring 106 is connected through a fitting 109 to a flexible steel tape 110 that is wrapped part way around and secured to the drum 104. The rate of the spring 106, i.e. the increment of load per increment of extension, is adjusted by varying the number of active coils by screwing a fitting 111, forming part of the support rod 107, into the upper end of the spring 106. The initial pull of the spring, used to offset the constant force applied through the lever 100, is adjusted by raising or lowering the upper end of the spring by means of nuts 112 threaded onto the rod 107.

An indicator 113 that is mounted on the indicator shaft 105 and rigidly attached to the drum 104 carries on its upper end a thin, preferably metallic, chart 114 having a plurality of accurately spaced perforations 115, one for each two divisions into which the weighing capacity of the scale is divided. As the indicator shaft turns during a weighing, the perforated chart 114 cooperates with a light source and photocell assembly 116 to generate a series of electrical impulses equal in number to the number of divisions representing the weight of the load. There are twice as many divisions as there are slots because each slot that passes the photocell is counted once as the chart moves forward and once again as the chart moves back.

The light source and photoelectric cell assembly 116 is shown in section in Figure X. This assembly comprises a base 117 to which a photocell housing 118 and a light source housing 119 are attached. The light source housing includes means for mounting a light source bulb 120 in position to project light through a narrow slot 121 in a mask 122 and then through a similar slot 123 in a mask 124 covering a photocell 125. The chart 114 moves between the masks 122 and 124 so that the slots 115 of the chart 114 may alternately admit and obstruct the light beam from the light bulb 120 through the slots 121 and 123 to the photocell 125. While an arrangement of masks and slots without lenses or focusing mirrors does not transmit as much light to the photoelectric cell as a lens system, the masks and slots provide sharp definition and high resolution in the generated signals. A plurality of adjusting screws 126 are provided for mounting the light source and photoelectric cell assembly 116 in position on the bracket 108 so that the light beam and chart slots 115 are accurately in register.

The indicator shaft 105 also carries a laterally directed arm 127 the end of which is fitted with an adjustable screw 128 cooperating with a cam 129 and stop screw 130. In the position shown with the scale at rest before a weighing, the indicator shaft 105 is turned counterclockwise to a position slightly behind zero so that slightly in excess of the net load applied through the flexible tape 103 is carried by the arm 127 and cam 129. As the cam 129 rotates clockwise during a weighing cycle the adjusting screw 128 drops off a corner 131 of the cam thus permitting the lever and indicating system to move in response to the unbalance of force between the load and counterbalancing spring 106. Since the unbalanced load forces that were supported by the cam 129 are suddenly transferred to the load counterbalancing spring 106 the maximum extension of the spring under such load forces is twice the static deflection at which the system would come at rest. The speed at which the indicating system moves to the maximum spring extension and returns is determined by the relative magnitude of the inertia of the system and the rate or stiffness of the load counterbalancing spring 106.

The cam 129 is preferably driven by a chain or gear drive, indicated generally by a chain 132 running over a sprocket 133 on a shaft 134 carrying the cam 129 and a second sprocket 135 mounted on a shaft 136 of a motor 137. The speed of the motor is selected according to the operating speed of the indicating system so that as the arm 127 swings in response to a maximum load and the adjusting screw 128 moves upwardly after reaching its maximum downward deflection a raising or leading edge 138 of the cam 129 closely follows but does not quite touch the lower end of the screw 128 until it has nearly reached the locked position shown in Figure IX.

The leading edge 138 of the cam 129 is an arc of a circle eccentric to the axis of rotation of the cam. If the radius of the circular arc, the maximum radius of the cam, and the position of the cam relative to the stroke of the arm 127 are properly selected, the leading edge of the cam 138 will very closely follow the return swing of the arm 127 without touching the screw 128 as a maximum load is being weighed.

A pair of cams 139 and 140 are also mounted on the shaft 134 to operate switch actuators 141, one of which is shown. The switch actuators 141 are arranged to operate switches one of which completes a circuit to the motor 137 to keep the motor running until the cam reaches the position shown and then to stop the motor at that position and hold it until a weigh signal is received. The switch actuator for this function cooperates with the short cam 140. That one of the switch actuators 141 cooperating with the cam 139 corresponds to the switch 52 shown in Figure VI and serves to transmit a signal to the electronic counter to reset the counter to zero as a weighing cycle begins and before the indicator arm 127 is released. Thus when a push button, similar to the push button 46 of Figure VI, is closed the motor 137 is started and causes the cam section 140 to release the actuator 141. This cam corresponds to the cam 49 in Figure VI.

This arrangement using the cam 129 to locate the lever is preferable to the rotary solenoid shown in the previous examples in that no pounding or battering of the indicating mechanism occurs at any time. The snap action of the rotary solenoid tends to produce wear that soon interferes with the accuracy of the scale. The cam 129, in contrast, gently urges the lever into locked position.

The locking screw 130 is set so that when the adjusting screw 128 of the arm 127 is pushed thereagainst a very slight clearance is left between the bottom end of the adjusting screw 128 and the constant radius portion of the cam 129. The starting position of the arm 127 and chart 114 is then adjusted by merely rotating the adjusting screw 128 thus varying its position relative to the arm 127. This second adjustment does not vary the clearance between the adjusting screw 128 and the cam 129.

Figures I, VII, VIII, and IX each show a load receiver that is operatively connected to a load counter-balancing spring and to electrical means adapted to generate a series of impulses having a number related to the movement of the load receiver. In each case the electrical impulses may be counted and indicated by an electronic counter.

The electrical circuits of a suitable electronic counter are schematically illustrated in Figure XIII. A conventional power supply (not shown) is arranged to maintain a B+ line 200 approximately 175 volts positive with respect to ground and a B— lead 201 175 volts negative with respect to ground. The electronic counter itself includes an amplifier stage 202, a pulse shaping stage 203, a reset pulse amplifier 204, and one or more banks of counter stages depending upon the maximum number of counts to be indicated. Each bank of the counter comprises 4 stages arranged to count to 9 in a binary system of notation and then reset to zero while entering one count into the next higher bank.

The photoelectric cell 40 (shown also in Figure I) has its positive electrode connected through lead 56a to the B+ lead 200 and has its negative electrode connected through the second lead 57 and a resistor 205 to ground. The junction between the lead 57 and the resistor 205 is connected through lead 206 and condenser 207 to a grid 208 of the amplifier stage 202. The amplifier has its cathode 209 connected directly to the B— lead 201 and has its plate or anode 210 connected through a plate resistor 211 to the B+ lead 200. The grid 208 of the amplifier 202 is connected through a first grid resistor 212 to the B— lead 201 and through a second grid resistor 213 to ground. This arrangement is such that except for the flow of grid current the grid 208 would be positive with respect to the cathode 209 and, because of grid current flow, is maintained at cathode potential in the absence of any signal received from the photocell 40. In this condition the amplifier 202 is drawing maximum current through the plate resistor 211.

As the photocell goes from dark to light and a positive voltage appears on the signal lead 206 no change or very little change is observed in the plate current of the amplifier tube because maximum plate current is already flowing. As the photocell goes from light to dark a negative signal appears on the lead 206 which serves to drive the grid 208 negative with respect to the cathode 209 thus cutting off the plate current through the resistor 211 and producing a positive signal at the plate 210.

The plate 210 is connected directly to a grid 214 of a second section of the amplifier 202 and it is also connected to the B— lead 201 through a condenser 215 of a sufficient size to prevent sharp transients from affecting the plate current through the second half of the amplifier 202. The cathode 216 of the second half of the amplifier 202 is maintained thirty to forty volts positive with respect to the B— lead 201 by a combination of a resistor 217 connected between the cathode 216 and the B— lead 201 and a resistor 218 connected between the cathode 216 and the B+ lead 200. The resistor 217 is bypassed by a condenser 219. A plate or anode 220 of the second half of the amplifier 202 normally draws no current but draws current momentarily whenever the grid 208 of the first section of the amplifier is driven negative. This curent through the plate 220 starts the production of a signal pulse in the pulse shaping stage 203.

The pulse shaping stage 203 comprises the two halves of a twin triode having cathodes 221 and 222 connected together and to the B— lead 201 through a cathode resistor 223 and a bypass condenser 224. The stage also includes a first and a second series resistor circuit connected between the B+ line 200 and B— lead 201. The first circuit includes a plate resistor 225, a plate to grid resistor 226, a grid to common resistor 227 and a common to B— resistor 228. The second resistor circuit comprises a B+ to plate resistor 229, a plate to grid resistor 230 and a grid to common resistor 231. The plate to grid resistors 226 and 230 are shunted by condensers 232 and 233 respectively.

The first half of the twin triode of the pulse shaping stage 203 includes its cathode 221, a control grid 234, and a plate 235. The control grid 234 is connected to the junction between the plate to grid resistor 226 and grid to common resistor 227 and is also connected to the plate 220 of the amplifier stage 202. The plate 235 of the first half of the twin triode is connected to the plate resistor 229 of the second resistor circuit. The second half of the twin triode has its grid 236 connected to the junction between the resistors 230 and 231 of the second resistor circuit and has its plate 237 connected to the plate resistor 225 of the first resistor circuit. Suitable resistor values for the resistors in the circuits are:

*Table 1*

| Resistors: | Resistance values in ohms |
| --- | --- |
| 223 | 15,000 |
| 225, 229 | 40,000 |
| 226, 228, 230 | 100,000 |
| 227 | 270,000 |
| 231 | 47,000 |

The plate to grid condenser 233 may be in the order of 300 micromicrofarads while the condenser 232 may be .01 microfarad. A .05 microfarad condenser is suitable for the cathode bypass condenser 224. Because of the relatively high resistance value of the grid to common resistor 227 the pulse shaping stage 203 has a stable operating condition with the first half of the twin triode drawing current and the second half cut off. Under these conditions the grid 234 is considerably positive with respect to the cathode 216 of the amplifier stage 202. As soon as a signal is transmitted through the amplifier stage 202 and its plate 220 draws current the potential of the grid 234 is reduced, i.e. the grid is driven negative with respect to its cathode thus tending to cut off the flow of current through the first half of the twin triode. This reduction in current flow through the plate resistor 229 produces an amplified positive signal at the second-half grid 236 thus causing current flow through the plate resistor 225 and plate 237. This current flow through the resistor 225 produces a negative signal that is transmitted through the plate to grid condenser 232 to the grid 234 thus tending to still further reduce the current flow through the first half. This action takes place very rapidly and results in a very sharp negative voltage impulse at the grid 234 which impulse is transmitted through a resistor 238 and a lead 239 to the input stage of the counting portion of the electronic counter.

While any of the various flip-flop or ring counters employing hard vacuum or gas filled electronic tubes may be used to count the impulses generated as the lever swings, a modified binary flip-flop counter circuit has been found to be satisfactory. Such an electronic counter comprises a plurality of banks or decades 240, 241, and 242. While the diagram shows three decades it is to be understood that more or less may be used depending upon the required counting capacity. Thus one decade can count to and indicate to 9, two decades to 99, three decades to 999, etc.

Each decade of the counter comprises four stages comprising a first counting tube 243, a second counting tube 244, a third counting tube 245, a fourth counting tube 246, and associated circuits for each. These counting tubes 243 to 246 inclusive together with their associated circuits count in the binary system of notation with the counting tube 243 counting the units, the tube 244 counting the twos, the tube 245 counting the fours, and the tube 246 counting the eights. A feed back arrangement is included such that each bank resets to zero on the tenth impulse supplied to that bank and simultaneously provides a signal impulse to the next higher bank. Thus each bank in itself counts in the binary system but the banks indicate in a decimal system.

The four stages of each bank are, with the exception of the feed back circuit connections, identical so that the description of one will suffice for all. Accordingly the circuits associated with the counting tube 243 are shown at enlarged scale in Figure XIV. In this circuit the counting tube 243 is a dual triode having a first or left half comprising a cathode 247, control grid 248 and a plate 249. The second or right half of the counting tube includes a cathode 250, grid 251, and plate 252. The cathodes 247 and 250 are connected directly to a grounded lead 253 while the grids and plates are connected to a pair of series resistor circuits that are generally similar to the circuits associated with the pulse shaping stage 203. The first of these circuits, shown at the left in Figure XIV, comprise a plate resistor 254 connected to the B+ lead 200 and the second or right half plate 252; a plate to grid resistor 255 connected between the plate 252 and the grid 248; a grid to common resistor 256 connected to the grid 248 and a common lead 257; and a common resistor 258 connected between the common lead 257 and the B— lead 201. The second resistor circuit at the right comprises a plate resistor 259 (which in the first and fourth stages is center tapped) connected between the B+ lead 200 and the first half plate 249 of the counting tube 243; a plate to grid resistor 260 connected between the plate 249 of the left half of the triode and the grid 251 of the right half; and a grid to common resistor 261 connected between the grid 251 and the common lead 257. The plate to grid resistors 255 and 260 are shunted by condensers 262 and 263 respectively.

To indicate the condition of the counter stage (the count to be indicated) a neon indicating lamp 264 in series with a current limiting resistor 265 is connected between the first or left plate 249 and the grounded lead 253.

Suitable resistor and capacitor values are:

Table 2

Resistors:
| | | |
|---|---|---|
| 254, 259 | ohms | 40,000 |
| 255, 258 and 260 | do | 100,000 |
| 256, 261 | do | 50,000 |
| 265 | do | 500,000 |

Condensers:
| | | |
|---|---|---|
| 262, 263 | micro-microfarads | 300 |

The circuits for the first and second halves are symmetrical and the resistance values and voltages are such that one-half or the other of the counting tube carries current. The circuit is such as to be unstable if both halves simultaneously attempt to carry current and the voltages on the various tube elements change one way or the other until one-half is cut off and the other half carries full plate current. This result is obtained because the plate current of either half of the tube lowers the potential of the grid of the other half of the twin triode sufficiently below cathode potential to cut off the plate current of said other half. Assuming for the moment that the plate 249 is drawing plate current, its grid 248 is at cathode potential and is drawing grid current while the plate 252 is approximately 120 to 125 volts positive with respect to its cathode 250. The condenser 262 is therefore charged to the same voltage, i.e. 120 to 125 volts. Since the plate 249 is drawing plate current, limited only by the plate resistance of the tube and the plate resistor 259, its voltage is about 25 to 30 volts positive with respect to its cathode 247. Under this condition the grid 251 is held about 20 to 25 volts negative with respect to cathode and the condenser 263 is thus charged to about 40 volts.

Signals, each comprising a sharp negative pulse from the pulse shaping stage 203, are transmitted through the lead 239 and are applied through a small coupling condenser 266 to the common lead 257 to momentarily drive this lead negative. This negative voltage impulse is transmitted through the grid-to-common resistors 256 and 261 and drive both grids 248 and 251 negative thus cutting off or reducing current flow in whichever half of the twin triode that current may have been flowing. With both sides of the triode non-conducting the grid 251 is positive with respect to the grid 248 because of the difference in the charges stored in the condensers 262 and 263. As the pulse or signal on the lead 239 disappears and the common lead 257 returns to its normal potential, the second or right half of the triode first draws current so that the counting tube assumes a stable state with the second half of the tube conducting current and the first half non-conducting. Under this condition the plate 249 is sufficiently positive with respect to ground to pass current through the neon indicating lamp 264 and thus indicate that the second half of the triode is conducting current.

When the transfer of plate current is from the second or right half to the first half of the twin triode a sharp negative pulse appears at the grid of the second half of the tube which is then having its plate current cut off. This pulse of current, transmitted through a lead such as the lead 267 of Figure XIV, serves as a tripping impulse for the next stage of the counter the same as the negative signal on the lead 239 served to trip the first counting tube 243.

Since the circuits for the counting tube 243 are symmetrical each impulse makes one change in the state of conduction so that two impulses are required for a complete cycle of operation of the counting tube.

At the start of any counting operation it is necessary that all the stages of the counter be in a particular counting condition. In the counter shown each stage has the first or left half of its twin triode tube conducting current and its second half non-conducting. This condition is obtained by applying a sharp positive impulse through a lead 268 and a resistor 269 connected to the first grid 248. This voltage impulse, by driving the grid 248 positive, causes the first half of the triode to conduct current whether it was previously conducting current or not.

The sharp positive resetting impulse for the lead 268 is generated in the reset amplifier 204. The reset amplifier 204 comprises a twin triode tube having its cathodes 270 and 271 connected to ground and having its second grid 272 connected through a resistor 273, and condenser 274 to a pulse generating circuit 275. The pulse generating circuit comprises a manually-operated, normally-open push button switch 276 having one contact connected to ground and its other contact connected through a pair of resistors 277 and 278 to the B+ lead 200. The junction between the resistors 277 and 278 is connected to ground through a condenser 279 and through the condenser 274 and resistor 273 to the grid 272 of the twin triode. A second resetting signal circuit from the lead 56 of Figure VI is taken through a condenser 280, resistor 281, and condenser 282 to the resistor 273 leading to the grid of the tube. A resistor 283 and a bypass condenser 284 are connected between ground and the junction of the condenser 280 and resistor 281 to serve as a filtering circuit to eliminate spurious signals. Furthermore the junction between the resistor 281 and condenser 282 is connected to a grid and plate 285 and 286 of the first half of the reset amplifier tube 204 so that a positive signal in this circuit cannot cancel a negative signal generated by the push button 276. The circuit for a plate 287, cooperating with the second grid 272, includes a resistor 288 and inductor 289 connected in series between the plate 287 and B+ lead 200. The reset signal lead 268 for the counter stages is connected through a condenser 290 to the plate 287. A positive reset impulse is thus supplied to the lead 268 whenever a negative signal is applied to the lead 56 or whenever the push button 276 is pressed. This signal, of short duration, is applied to the grid of the first half of each of the counter stages of all the decades thus causing all of the stages to be conducting in their first halves thus indicating a zero count.

In the operation of this counter each light impulse falling on the photocell 40 produces an electrical impulse that is transmitted through the amplifier 202 and the pulse shaping stage 203 to provide a triggering impulse on the lead 239. The first of these impulses applied to the first counter stage including the tube 243 triggers that stage from its first to its second condition so that it then draws current through its second half. Incidentally with the transfer of current a positive voltage impulse is transmitted through a lead 291 (Figure XIII) and small condenser 292 to a lead 293 that is connected to the second half grid of the last of the counter stages 246 and to the next decade 241. This positive voltage with the first signal has no effect on the remainder of the circuits because it is insufficient in magnitude to trigger the last stage 246. The condenser 292 has about ⅙ the capacity of the plate to grid condensers in each counter stage.

As the next negative impulse occurs on the lead 239 the first counter stage 243 returns to its original condition and in so returning applies a sharp negative impulse both on the lead 291 and on its output lead 267 leading to the second stage 244. This second stage thereupon transfers to its second condition thereby lighting its neon bulb 264-2 thus indicating two counts. The third impulse again triggers the first stage for current conduction through its second half thus lighting its indicator light 264-1 the two lamps indicating a count of three units. The fourth impulse returns the first stage to its off condition, that stage in turn then transmits a signal to the second stage which is returned to its off condition and that stage in turn transmits a signal through its output lead 294 to the third stage which thereupon trips to its second condition to light its lamp 264-4 thus indicating a count of four units, the lights 264-1 and 264-2 now being dark. The fifth, sixth and seventh impulses are counted in the first two stages 243 and 244 so that after the seventh impulse the three indicating lamps 264-1, -2, and -4 are lighted showing a count of seven units. The eighth impulse returns the first stage to its non-indicating condition, it in turn triggers the second stage to its non-indicating condition, it in turn triggers the third stage to its non-indicating condition thereby causing it to transmit, through its output lead 295, a signal to the fourth stage 246 thereby causing it to transfer to its indicating condition and light its indicating light 264-8.

As the last stage transfers to indicating condition its second half grid, connected to the line 293, is raised to cathode potential so that this stage may be reset should a small negative impulse be applied to the lead 293. The ninth impulse triggers the first stage to its indicating condition but makes no other change in the condition of the various stages. At this point the first and fourth stages are in indicating condition.

The tenth impulse on the lead 239 triggers the first stage 243 back to its non-indicating condition and in so doing transmits through the lead 291 and condenser 292 a sharp negative impulse to the grid 251-8 of the last stage so as to reset this stage to its non-indicating condition. As this stage resets, a negative pulse is transmitted through a lead 296 and lead 294 to the second half grid 251-2 of the second stage to drive this grid negative and thus prevent this stage from responding to the signal from the first stage. This sharp negative impulse delivered from the last stage through the lead 296 is insufficient in amplitude to trigger the third stage 245 so that the net effect of the signals sent back through the lead 296 is to leave the second counter stage to non-indicating condition without triggering the third stage so that after the tenth impulse the four stages are all returned to their original condition, i.e. all are in non-indicating condition.

The resetting of the fourth stage 246, initiated by the signal through the lead 291 and condenser 292 of the first stage generates a pulse signal that is transmitted through the lead 293 to the second bank or decade 241 of the counter to register a single count therein. This counter bank 241 operates to indicate the tens of units and resets after it receives ten impulses (100 impulses on the lead 239) and transmits a signal to the third bank 242 which in turn indicates the hundreds of units. The actual count is read noting which of the indicating lamps of each decade are on and interpreting the counting accordingly.

The triggering of each stage in a counting operation occurs so rapidly that the electrical circuits have no difficulty whatsoever in accurately following and counting the impulses produced by the photoelectric cell 40 and thus are able to indicate the count regardless of the speed of movement of the shutter 32.

It may be desirable in certain applications of the improved scale to eliminate the timing motor 43 (shown in Figure VI) and substitute for it an all electronic circuit. Such a circuit is illustrated schematically in Figure XV.

As shown in this figure the circuit comprises a first tube 300 of sufficient current carrying capacity to carry the current required by a rotary solenoid used to latch or catch the lever. Such a solenoid may have a coil 301 connected in series between a B+ lead 302 and a plate 303 of the tube 300. The cathode of the tube 300 is connected directly to ground while its screen grid 304 is connected to the B+ lead. A control grid 305 of the tube 300 is connected to a B— lead 306 through a resistor 307 and is connected through another resistor 308 to a plate 309 of a twin triode 310. The plate 309 of the first half of the triode 310 is connected through a plate resistor 311 to the B+ lead 302. A grid 312 of the twin triode 310, cooperating with the plate 309, is connected through a condenser 313 to the plate 303 of the tube 300 and is connected through a resistor 314 to a slider 315 of a voltage divider 316 connected between the B+ lead 302 and ground. The second half of the twin triode has its grid 317 connected to the grid 312 of the first half and has its plate 318 connected through a resistor 319 and inductor 320 to the B+ lead 302. Preferably the solenoid coil 301 is bypassed by a resistor 321. Preferably but not necessarily the resistor 308 joining the plate 309 of the twin triode 310 to the grid 305 of the tube 300 is shunted by a condenser 322.

A push button 323 used to start a weighing has one contact connected to ground and has its other contact connected through the parallel combination of a resistor 324 and condenser 325 to the plate 303 of the first tube 300. In this circuit the plate 309 of the twin triode 310 normally draws plate current because its grid is connected through the resistor 314 to a positive potential provided by the voltage divider 316. This plate current flowing through the resistor 311 reduces the voltage on the grid 305 sufficiently below cathode potential so no current flows through the rotary solenoid coil 301 and plate 303. During this time plate current to the plate 318 flows through the resistor 319 and inductor 320 so that as this current is cut off a sharp positive pulse of voltage appears at the plate 318. The plate 318 is connected through a coupling condenser 326 to the counter reset lead 268 which lead, when driven positive, resets the counter to zero.

When it is desired to make a weighing the push button 323 is closed so that the plate 303 of the tube 300 which was at the same potential as the B+ lead 302 is grounded through the condenser 325. This supplies a negative voltage through the condenser 313 to the grid 312 of the triode 310 thus cutting off the flow of current through its plate resistor 311. This results in a positive voltage signal at the grid 305 of the tube 300 so that this tube draws plate current thus permitting the push button 323 to be released. At the same time that the grid 312 was driven negative the grid 317 of the second half of the triode was also driven negative to produce a positive voltage at its plate 318 which voltage signal is transmitted through the lead 268 to reset the counter. All of this action takes place before the lever has time to move and thus the counter is in condition to record the number of impulses as the lever goes through its range of travel according to the load on the load receiver. As the charge on the condenser 313, which had been charged to a voltage equal to the voltage on the B+ lead, drains off through the resistor 314 it raises the potential of the grid 312 so that it may again allow current to flow through the plate resistor 311 and plate 309 thus driving the grid 305 of the tube 300 negative and cutting off flow of current through the solenoid 301. The solenoid then releases to catch the lever. The timing required so that the solenoid releases just as the lever completes its swing is controlled by the time constant of the condenser 313 and resistor 314 in combination with the position of the slider 315 on the voltage divider 316. The further the slider is moved toward the B+ end of the voltage divider 316 the shorter the interval during which the solenoid 301 is energized. A 2 to 1 range of timing intervals may easily be obtained by merely moving the slider along the voltage divider 316.

These electronic timing and counting circuits or others performing the same functions when used in cooperation with high speed spring scales constructed according to the invention provide high speed indication of load without sacrifice of accuracy and permit weighing operations to be performed reliably in a fraction of the time required by any other available weighing systems of comparable accuracy.

Various modifications both of the mechanical and of the electrical portions of the improved weighing scale may be made without departing from the scope of the invention.

Having described the invention, I claim:

1. In a device of the class described, in combination, a movable load receiver, a load counterbalancing spring operatively connected to the load receiver, a pivotally mounted lever operatively connected to the load receiver, a cam follower operatively connected to the load receiver, a cam engaging said follower and adapted to hold the lever at one end of its range of travel, said spring being adapted to counterbalance a capacity load on the load receiver when said lever is at rest near the midpoint of its range of travel, a motor drive arranged to drive said cam one revolution in approximately one oscillation interval of said load receiver and lever and to gradually engage the follower operatively connected to the load receiver during the latter portion of the oscillation interval and urge the lever to said one end of its range of travel, a shutter having alternate opaque and transparent sections attached to the lever, a photoelectric system cooperating with the shutter to produce a series of electrical impulses as the lever oscillates, and an electronic counter connected to said photoelectric system for counting the number of impulses.

2. In a device of the class described, in combination, a movable load receiver, a load counterbalancing means operatively connected to the load receiver, a cam follower operatively connected to the load receiver, a cam engaging said follower and adapted to hold the load receiver at one end of its range of travel, a motor drive arranged to drive said cam one revolution in approximately one oscillation interval of said load receiver to gradually engage the follower operatively connected to the load receiver during the latter portion of the oscillation interval and to urge the load receiver to said one end of its range of travel.

3. A load measuring device comprising a load receiver, a load counterbalancing means operatively connected to the load receiver, a movable system operatively connected to said receiver and moving through an oscillation having a magnitude which is a function of the applied load, a portion of said system cooperating to establish a fixed position for said system, first means engaging said portion of said system to maintain said system in said position, means disengaging said first means from said portion, and means advancing said first means toward said position along the path of movement of the cooperating portion of said system during the second half of the period of said oscillation to gradually engage said portion and lock said portion in said position.

4. In a device of the class described, in combination, a moving system including a movable load receiver, load counterbalancing means operatively connected to the load receiver, a movable support for said load receiver, and an element whose maximum displacement is a function of the load applied to said load receiver, said element being operatively connected to said load receiver, a catch to maintain said moving system in its no load position, a portion of said moving system adapted for engagement by said catch, catch withdrawing means, means to advance said catch toward said portion of said system along a path generally corresponding to the path of movement of said system toward its no load position an interval after the operation of said withdrawing means generally corresponding to a period of the moving system, and a cam surface on said catch adapted to gradually engage said portion of said system and to urge said system to its no load position.

5. In a device of the class described, in combination, a moving system including a movable load receiver, load counterbalancing means operatively connected to the load receiver, a movable support for said load receiver, and an element whose maximum displacement is a function of the load applied to said load receiver, a cam having a minimum radius over a segment which is traversed in greater than one-half the period of said moving system when subjected to its maximum load, a maximum radius and a gradually increasing radius over the segment between said minimum and maximum radii, a shaft supporting said cam, a follower operatively connected to said moving system engaged by said cam at its maximum radius to maintain said system in its no load position and arranged to move with said system in a plane normal to said cam shaft, and means rotating said shaft and cam at a rate which carries said cam through an arc from said initial minimum radius through said gradually increasing radius to said maximum radius in an interval approximately equal to the period of said moving system when subjected to its maximum load.

References Cited in the file of this patent

UNITED STATES PATENTS

| | | |
|---|---|---|
| 2,235,725 | Nordquist | Mar. 18, 1941 |
| 2,417,642 | Gilchrist | Mar. 18, 1947 |
| 2,605,694 | Moss | Aug. 5, 1952 |
| 2,605,695 | Campbell | Aug. 5, 1952 |
| 2,678,726 | Root | May 18, 1954 |
| 2,742,152 | Salwasser | Apr. 17, 1956 |
| 2,759,603 | Bradley | Aug. 21, 1956 |